United States Patent
Melo

(10) Patent No.: US 9,332,140 B2
(45) Date of Patent: May 3, 2016

(54) MULTI-PURPOSE DOCUMENT EQUIPMENT MANAGEMENT SYSTEM AND METHOD OF USE

(75) Inventor: William Melo, Irvine, CA (US)

(73) Assignee: TOSHIBA AMERICA BUSINESS SOLUTIONS, INC., Irvine, CA (US)

( * ) Notice: Subject to any disclaimer, the term of this patent is extended or adjusted under 35 U.S.C. 154(b) by 67 days.

(21) Appl. No.: 14/115,604

(22) PCT Filed: May 18, 2012

(86) PCT No.: PCT/US2012/038712
§ 371 (c)(1),
(2), (4) Date: Oct. 28, 2014

(87) PCT Pub. No.: WO2012/159090
PCT Pub. Date: Nov. 22, 2012

(65) Prior Publication Data
US 2015/0229793 A1   Aug. 13, 2015

Related U.S. Application Data

(60) Provisional application No. 61/488,095, filed on May 19, 2011.

(51) Int. Cl.
| | |
|---|---|
| G06F 3/12 | (2006.01) |
| H04N 1/00 | (2006.01) |
| G06Q 10/06 | (2012.01) |
| H04L 29/08 | (2006.01) |
| G06K 15/00 | (2006.01) |
| G06Q 10/00 | (2012.01) |

(52) U.S. Cl.
CPC ........... *H04N 1/00344* (2013.01); *G06Q 10/06* (2013.01); *H04L 67/025* (2013.01); *H04L 67/10* (2013.01); *H04N 1/0005* (2013.01); *H04N 1/00037* (2013.01); *H04N 1/00042* (2013.01); *H04N 1/00055* (2013.01); *H04N 1/00061* (2013.01); *H04N 1/00082* (2013.01); *H04N 1/00477* (2013.01); *G06Q 10/20* (2013.01)

(58) Field of Classification Search
None
See application file for complete search history.

(56) References Cited

U.S. PATENT DOCUMENTS

| | | | |
|---|---|---|---|
| 6,522,421 | B2 | 2/2003 | Chapman et al. |
| 7,383,474 | B2 | 6/2008 | Sekizawa |
| 7,779,108 | B2 | 8/2010 | Kawai |
| 2001/0034627 | A1 | 10/2001 | Curtis et al. |
| 2002/0069214 | A1 | 6/2002 | Smith et al. |
| 2004/0141201 | A1 | 7/2004 | Shima |
| 2007/0030999 | A1 | 2/2007 | Hyakutake et al. |
| 2008/0246986 | A1 | 10/2008 | Scrafford et al. |
| 2008/0295101 | A1 | 11/2008 | Vicars et al. |
| 2009/0094091 | A1 | 4/2009 | Thieret et al. |

OTHER PUBLICATIONS

WO, PCT/US2012/038712 ISR, Aug. 14, 2012.
WO, PCT/US2012/038712 IPRP, Nov. 19, 2013.

*Primary Examiner* — Dov Popovici
(74) *Attorney, Agent, or Firm* — One LLP

(57) ABSTRACT

Provided herein are systems for management and control of document production devices, as well as methods and software for their use. These systems can include a server configured to host a document management service. The server can have a plurality of local user interfaces adapted for electronic and/or optical data communication with one or more remote user interfaces and one or more document production devices. The server can have a plurality of purpose-specific application interfaces which further communicate over a communications network with a plurality of purpose-specific applications.

20 Claims, 3 Drawing Sheets

MULTI-PURPOSE DOCUMENT EQUIPMENT MANAGEMENT SYSTEM AND METHOD OF USE

CROSS REFERENCE TO RELATED APPLICATIONS

The present application is a national phase application of PCT Serial No. PCT/US2012/038712, filed May 18, 2012, which claims the benefit under 35 U.S.C. §119 to U.S. provisional patent application Ser. No. 61/488,095 filed May 19, 2011. Both of these applications are hereby incorporated by reference into the present application in their entirety as if fully set forth herein, and for all purposes.

RELEVANT FIELD

The systems and methods disclosed herein relate generally to tools that allow for the more efficient provision and usage of document equipment and services relating thereto and, more particularly, to the integration of multiple specific-purpose support systems to allow centralized management of document equipment and services by a document equipment provider.

BACKGROUND

Documents represent an essential and costly part of any business. Resources from numerous locations and entities are required to operate document generating equipment, such as printers, copiers, scanners, facsimile machines, multi function units, plotters, and the like. For example, operation of a typical printer requires network access, a power outlet, and regular maintenance such as the re-supply of toner and paper. Supplying resources for a printer is typically a manual endeavor that requires location of an outlet, installation of a network port, installation of printer drivers on user's computers, regular monitoring of the toner supply, and coordination with a toner supplier for restocking and/or replacement. This can require an office administrator to interface with any number of different entities, including vendors, service technicians, and device manufacturers (hereinafter "service providers"). Optimization of the use of a printer is also typically a manual endeavor that requires assessment of the number of users for a particular printer, the frequency of usage of the printer, the amount in which those users generate hard versus soft copies at the printer, and the like.

Some tools exist for management of document equipment. One such example is described in U.S. Patent Application Publ. 2005/0015399, titled "Web-based Analytical Tool for Collaborative Fleet Optimization." For instance, toner can be purchased over internet and e-commerce sites, and maintenance can be arranged through automated requisitioning websites of the maintenance providers. The reliance on different purpose-specific applications or websites to provide services, however, is a manually intensive effort and usually requires significant time and effort on the part of the office administrator or similar personnel.

Thus, there exists a need for the management of document equipment and related services in a more efficient autonomous manner, and/or that eliminates or reduces the manually intensive labor currently used.

SUMMARY

Provided herein are systems for management and control of document production devices, as well as methods and devices with software for their use. These systems can include a server configured to host a document management service.

For example, the server can have a plurality of local user interfaces that are adapted for electronic and/or optical data communication with one or more remote user interfaces and one or more document production devices. These communications can occur over a communications network. The server can be adapted to have a plurality of purpose-specific application interfaces which further communicate over a communications network with a plurality of purpose-specific applications. The server can be further adapted to receive a first status from a first document production device of said one or more document production devices, the first status being indicative of a current level of resources available. Upon receiving the first status, the server can communicate a request, to at least one of the purpose-specific applications to request fulfillment of that resource. Upon fulfillment, the server can then transition the document production device from the first status to a second status that is indicative of a target level of resources.

Other systems, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments in this summary section, or in the following description sections, be construed as limiting the appended claims, absent express recitation of those features in the claims.

BRIEF DESCRIPTION OF THE DRAWINGS

The details of the inventive subject matter, both as to its structure and operation, may be gleaned in part by study of the accompanying figures, in which like reference numerals refer to like parts. The components in the figures are not necessarily to scale, emphasis instead being placed upon illustrating principles. Moreover, all illustrations are intended to convey concepts, where relative sizes, shapes and other detailed attributes may be illustrated schematically rather than literally or precisely. Aspects of the inventive subject matter are illustrated by way of example, and not by way of limitation, in the accompanying drawings wherein.

DETAILED DESCRIPTION

Figure 1:
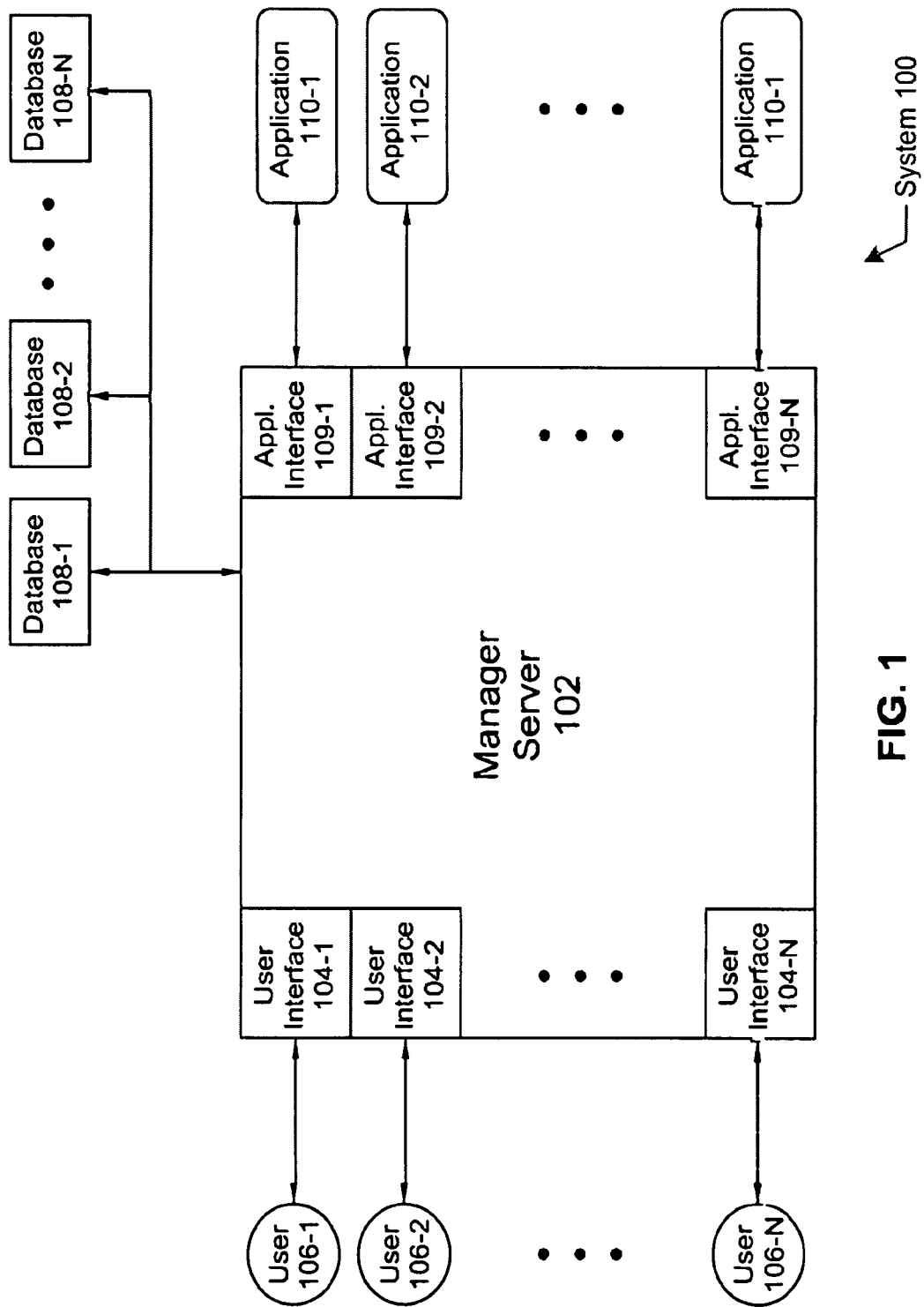
FIG. 1 is a logical block diagram depicting an example embodiment of a multi-purpose document equipment and services management system.

The detailed description set forth below in connection with the appended drawings is intended to describe various example embodiments and is not intended to represent the only embodiments that may be practiced.

Disclosed herein are multi-purpose document equipment management systems and methods for using the same. This system (or systems) is accessible by all parties that participate in the provision or use of document equipment, or in the provision or receipt of services related to document equipment. Document production equipment or devices, as used herein, refers to equipment used in the generation of documents, such as a printer, copier, scanner, facsimile machine, plotter, multifunction device, and the like.

The systems and methods described herein represent advancements over the tool described in the aforementioned U.S. Patent Application Publication 2005/0015399. This '399 application discloses and implies implementation details relating to the structure, function and operation of web-based tools in the relevant field and is fully incorporated by reference herein for all purposes.

The management system, via a remote user interface, facilitates the interaction between a document equipment or document services provider and its customers. The management system can be used to gauge a current state of document equipment for the customer along with the customer's current needs. For example, the customer could have a need to install document equipment in a location where none exists, or the customer could have a need to optimize so that document equipment already installed is used more efficiently. The current state of the document equipment can be assessed by querying, collecting, and analyzing information specific to that customer.

The system further allows a target state to be specified or programmatically designed for that customer based on that customer's needs. The system may then be used to determine all steps, or activities, that are to be carried out in order to transition the customer from the current state to the target (new) state. Each step can be manifested as a work order requesting work to be performed by the provider or by an agent (contractor, subsidiary, dealer, subject of out-sourcing, etc.) of the provider. Steps can also be manifested as written notices (email, letter, etc.) to the extent applicable.

A non-exhaustive list of example activities within the transition can include: the deployment of new document equipment at the customer site; movement of existing document equipment; removal of existing document equipment; the optimization of existing document equipment at the customer site; the management or replenishment of supplies for document equipment at a customer site (e.g., replacement of toner or other supplies); the performance of maintenance services on a piece of document equipment; the installation of a power outlet or network port (e.g., ethernet jack); or any combination thereof. Each of these activities may require one or more steps for completion.

The system integrates multiple purpose-specific applications so that all required systems and subsystems for performing these activities can be accessed through a centralized management system.

FIG. 1 is a logical block diagram depicting an example embodiment of a multi-purpose document equipment and services management system 100. Management system 100 preferably includes a management server 102, one or more databases 108, one or more purpose-specific applications 110 (which can also be referred to as support systems or services), local user interfaces 104 (user-server interfaces, local user interfaces, or local ports), and application interfaces 109 (application-server interfaces, purpose-specific application interfaces, or local application interfaces). One or more users 106 have access to server 102 over a communications network 204 (see FIG. 2), such as the internet, preferably through secure access protocols or portals. System 100 may be implemented as a cloud-type computing network, which can rely on multiple networks, storage elements, applications and communications protocols dispersed over a wide geographic area.

FIG. 1 uses a reference numeral convention where the reference numeral of a particular class of element is recited first (e.g., application 110) followed by a hyphen and a numeral representing the particular instance of that element. For instance, application 110-2 is the second application, and application 110-N is the Nth instance of that application. It should be understood that any number of elements can be used with system 100, including multiple servers 102, and that the systems and methods described herein are not limited to any particular quantity.

Ownership and/or administration of system 100 is preferably performed by a document equipment and/or document services provider that employs, contracts with, or otherwise relies upon secondary entities such as sub-service providers, dealers, subsidiaries, contractors (e.g., installers of network ports, phone lines, or power outlets), or wholesalers. This allows a pyramidal approach to the management of services and equipment by system 100 such that the primary service and equipment provider is allowed the greatest visibility into the management process.

Access to system 100 may be granted to any user 106 that is responsible for providing, managing, or using document equipment and related services. For example, user 106 may be the owner or administrator of system 100, or a sales person employed by that entity. User 106 may also be any employee of the secondary entities discussed in the preceding paragraph (e.g., a sub-service provider that provides document equipment maintenance to a customer). User 106 may also be a customer that subscribes to system 100 for the purpose of purchasing equipment or document services from the provider. Each user 106 has access to server 102 through an interface 104. The user interface 104 has an associated role or permission for each user that it serves. The role or permission governs the degree of access that that user is allowed so that the features and data are restricted appropriately.

User interfaces 104 are preferably local to the server, communicates with a user 106 located remotely, and is not necessarily dedicated to a particular user 106. The local user interface 104 preferably includes the port communications hardware and associated software to establish and maintain a communication link with a user 106. This hardware and software is well known to those of ordinary skill in the art.

Each user 106 will have a remote user interface that can be accessed directly at the user's location. Each remote user interface will preferably include a graphical user interface (GUI) through which the user can interact to provide input to system 100 as well as to receive outputs from system 100 in the form of status information, order completions and the like. The local and remote user interfaces may be internet-based (e.g., a web page), and accessible through a secure protocol or methodology, as discussed. The local and remote user interfaces can also communicate messages from server 102 that notify a particular user 106 of an event (e.g., low toner, low paper, maintenance required, completion of a work order, receipt of a purchase order, etc.) via email, SMS, MMS, and the like. The message may include links to a web page where the customer can act on a particular notification (e.g., order toner, order paper, request maintenance, etc.).

A remote user interface may provide a graphical display of a particular end customer's facilities, such as a facility layout plan. The facility layout plan may include: multiple floors or buildings; a layout of offices in each floor or building; identification of an employee in each office, the location of document equipment in the office, floor or building; identification of the document equipment (e.g., make, model, serial number); the location of power outlets and/or network ports and the associated type of each outlet and port; what outlet and/or port is currently in use; usage statistics about the document equipment; amount of toner (and/or paper) available in the document equipment; current supplies (toner, paper) for the document equipment; date of last service of the document equipment; the identification of what service was performed on the document equipment; and the like. Information about the document equipment can be presented in a graphical display that appears when the user 106 selects a piece of document equipment (or mouses over the document equipment). The facility layout plan may be used to assess the current state of the customer and to design a new target state for the customer. System 100 can assess what changes need to be made to achieve the new target state and programmatically issue the appropriate work orders to achieve that new state.

The purpose-specific applications or modules 110 that may be integrated with server 102 can include numerous examples. For instance, application 110 can be directed to management of a sales force. The sales force application 110 may be used to track and manage sales opportunities generated by transaction with an end customer. An example of such an application is the web-based salesforce.com. Another example of a purpose-specific application 110 is a fleet auditing support system. Such a fleet auditing support system can be used to provide usage and asset information regarding the document equipment that is described by the current or target state of the customer.

Yet another example of an application 110 is an enterprise resource planning (ERP) application, which can have multiple purpose-specific modules that enable customer account management functions and their proper operation. Example modules include a product module that contains information about products that will be shipped to or billed to the customer, a customer module that contains customer contact information, which may also be part of a database 108 that communicates with the application 110, an installment application that includes asset information about each asset installed at a customer site, and a price application that can be customer specific and that can list products that are available for sale as well as their purchase prices. An example of this application is the Oracle ERP application.

Another application 110 that can be integrated with system 100 is a demand planning application that can provide product and quantity forecasts. And yet another application that can be integrated with system 100 is a work order management application that generates work orders and tracks the progress of work orders that are used to perform actions on behalf of the customer. The number of applicants or modules 110 that may be adequately supported is only limited by the manager server's 102 physical resources. The system 100 can be leveraged to exploit as many or as little applications 110 as are presently installed and configured at any one time.

The purpose-specific application interfaces 109 preferably each include the port communications hardware and associated software to establish and maintain a communication link with the purpose-specific application 110, if that application is not running local to the server 102 (or server platform having multiple servers). This hardware and software is well known to those of ordinary skill in the art.

Figure 2:
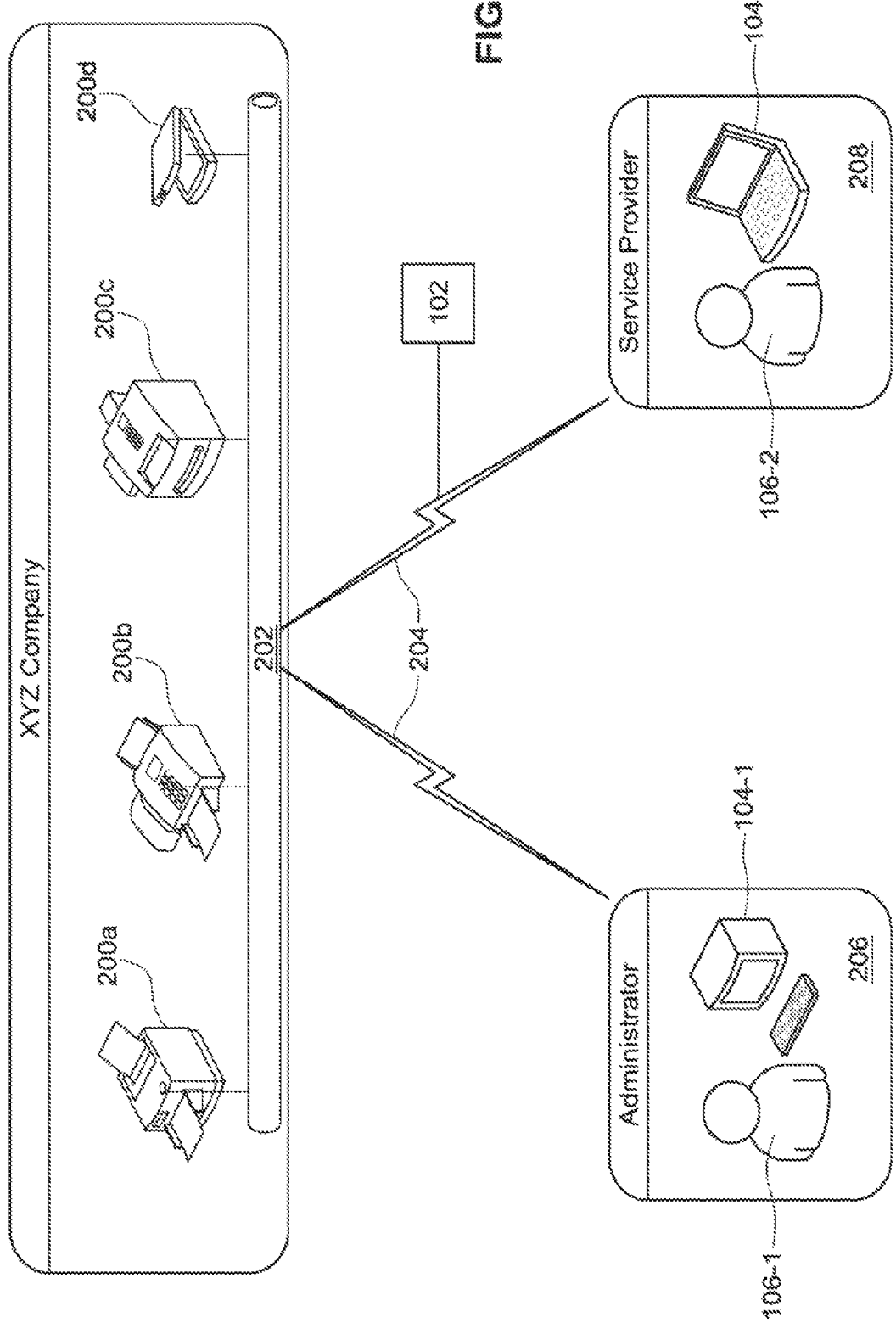
FIG. 2 is a physical network diagram depicting an example embodiment of a series of document production devices residing at an example business environment that are managed by an Administrator and a Service Provider over a communications network.

FIG. 2 is a physical network diagram depicting an example embodiment of a series of document production devices 200 residing in an example business, corporate, or public sector environment (e.g., corporation, partnership, government entity, and the like) that are managed by an administrative user 106-1 and a service provider user 106-2 over a communications network 204. This example company is depicted as having a printer 200a, a facsimile machine 200b, a multifunction device 200c, and a scanner 200d. Regardless of physical placement, the system 100 may manage each of said document production device over a communications network 204. Although not exhaustive, and only by way of example, document production devices 200 are all compatible with the system 100, including laser printers, ink printers, copiers, scanners, facsimile machines, multi function units, and plotters. In order to facilitate communication with document production devices 200, they necessarily must be connected to a communications network 204 via the local area network 202. Regardless of network topology associated with local area network 202, communications must be established between the manager server 102, the document production devices 200, and at least one user interface 104.

Figure 3:
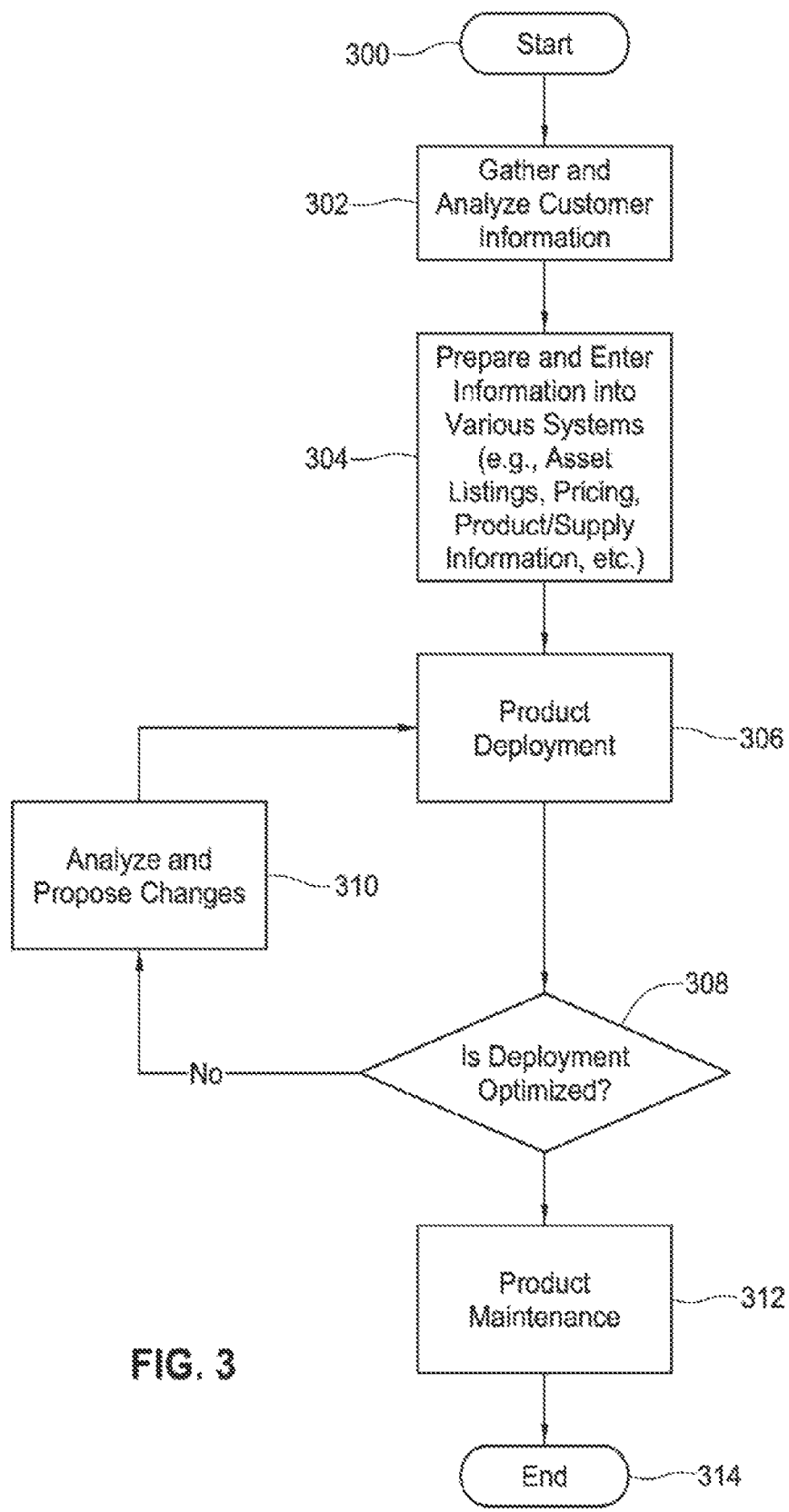
FIG. 3 is a flowchart detailing an example embodiment of the operation of a document service manager system of FIG. 1.

FIG. 3 is a flowchart detailing an example of the operation of a document service manager system 100 of FIG. 1. System 100 is preferably used during all stages in the life cycle of document production equipment 200. From the perspective of a document equipment and services provider, these stages generally include a proposal stage 302, a pre-flighting stage 304, deployment and optimization stages 306 and 308, and an account management stage 312.

The proposal stage 302 generally includes the gathering and analyzing of information about the customer, which may then be used to prepare and deliver a proposal for equipment 200 or services to be sold to the customer. This stage 302 may include the making of a current state assessment about the customer's document production equipment 200 as well as the customer's needs for that document equipment 200 in the future. This stage 302 can involve the receipt of information from the customer regarding all aspects of the current document equipment 200 environment and can extend to information about the customer's facilities and needs. For instance, information about the customer's floor plan can be gathered or collected. Information about the availability of resources such as power outlets, network ports, phone ports, as well as their specific locations on the floor plan can be gathered. Information regarding the number of employees at the customer location(s), and their typical usage rates of the document equipment 200 may also be gathered. This information can be stored in one or more databases 108. This stage 302 generally concludes with the formation of a contract with the customer for the sale of equipment 200 or services.

Information about the office document equipment 200 that may be collected includes, but is not limited to, how many devices are operated by the customer, where those devices are placed on the floor plan, what volume of usage each device receives, the costs associated with the device in terms of costs for maintenance and component replacement, the volume of hard or soft copy documents the device is used to generate, names and locations of the employees that interface with that document equipment, and the names and functions of the customer's infrastructure interfacing with the document equipment. All this information can be used to make the current state assessment for the customer. This information can be collected by direct querying of the customer or programmatically querying the document produce devices 200 over the communications network 204, wherein, when done in the latter method, the software also collects information about those devices 200 such as their make, model, serial number, usage statistics, and the like. Additional information can be collected from the customer regarding the customer's new desired state, such as new office space that requires document equipment, optimization of the currently installed document equipment, location of employees that need to rely on document equipment, and the like.

The pre-flighting stage 304 generally includes the step of preparing and entering the needed information into the various applications 110 after the customer has been engaged for a given proposal. This can include server 102 interfacing with each of the applications 110 to provide those applications 110 with the data necessary for those applications 110 to perform their functions, including identification of the customer, assets owned by the customer, pricing, contract data from the proposal, and information regarding the supplies needed by the customer to maintain the office equipment. Interfacing with application 110 preferably is accomplished with application-specific interfaces 109. These interfaces 109 are configured to use the appropriate protocol to communicate to and receive information from the application 110. Interfaces 109 can also be aggregated and presented to users 106 via the remote user interface 104.

The next stage in the life cycle of the document equipment is the deployment and optimization stages 306 and 308. All actions that are necessary to transition the customer from the current state to this target state generally occur in the deployment and optimization stages 306 and 308. The deployment stage 306 generally includes the deployment of new equipment into the customer's fleet, removal of old equipment, and the optimization of new or existing equipment to achieve greater efficiency, and the like.

The optimization stage 308 may include the process of reconfiguring the customer's existing devices 200 as well as managing the most efficient installation of new equipment, relocating current equipment, and/or removing current equipment. Each activity is generally associated with the creation of a work order. The deployment and optimization stages 306 and 308 generally conclude when the customer has reached the target state.

The deployment and optimization stages 306 and 308 can be characterized as the stages where implementation of the proposed recommendations for the customer (determined in the proposal stage 302) occurs. Server 102 will determine the work orders that are needed to transition the customer from the current state to the target state and sequence those work orders appropriately. Work orders can be made dependent upon the completion of other work orders to ensure that the proper order is adhered to. Work orders may be scheduled and the progress of the work order can be monitored by system 100. Work orders may also be arranged hierarchically such that work orders may be accomplished in parallel as well as in series to allow for the most efficient transition from the current state to the customer's target state. Each work order may rely on information contained in databases 108 or information provided by applications 110 during its pendency. Administrative users 106 can interface with server 102 to monitor the progress of the work orders and to edit those work orders while in process if needed. Work orders can be generated for other service providers 208 and system 100 can be configured to interface with the other necessary service providers 208 to generate and complete each work order.

What is typically the final stage in the life cycle of document equipment is the maintenance or management stage 312. During this stage, certain activities can occur on a regular basis such as the ordering of additional toner, service requests, requests for new devices, requests for relocation of existing devices, requests for removal of existing devices, collection of usage or meter information, software or firmware updates, and the like. These management activities can be viewed as more basic state transitions for the customer. For instance, a customer may currently be in a state of low toner for a particular printer, and the desired target state can be viewed as the replacement of the toner for the customer. This can involve the generation of work orders that request the toner be shipped to the customer, that the customer be billed, and possibly that a maintenance or customer support individual be sent to the customer's site for installation of the toner. The management stage 312 would involve the creation of all the work orders necessary to perform these activities to allow the customer to transition from the current stage to the target stage.

While the specification describes particular embodiments of the inventive subject matter, those of ordinary skill can devise variations of the inventive subject matter without departing from the inventive concept. Also, the previous description is provided to enable any person skilled in the art to practice the various embodiment described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language of the claims, where reference to an element in the singular is not intended to mean "one and only one" unless specifically so stated, but rather "one or more." All structural and functional equivalents to the elements of the various embodiments described throughout this disclosure that are known or later come to be known to those or ordinary skill in the art are expressly incorporated herein by reference and are intended to be encompassed by the claims. Moreover, nothing disclosed herein is intended to be dedication to the public regardless of whether such disclosure is explicitly recited in the claims. No claim elements are to be construed under the provisions of 35 U.S.C. §112, sixth paragraph, unless the element is expressly recited using the phrase "means for" or, in the case of a method claim, the element is recited using the phrase "step for."

What is claimed is:

1. A document service manager system comprising:
   manager server hardware configured to host a document management service, said manager server hardware comprising:
   a plurality of local user interfaces including port communications hardware for electronic and/or optical data communication with one or more remote user interfaces and one or more document production devices over a communications network; and
   a first purpose-specific application interface including port communications hardware for electronic and/or optical data communication with a first purpose-specific application for management of a sales force;
   a second purpose-specific application interface including port communications hardware for electronic and/or optical data communication with a second purpose-specific application for fleet auditing support;
   a third purpose-specific application interface including port communications hardware for electronic and/or optical data communication with a third purpose-specific application for enterprise resource planning;
   a fourth purpose-specific application interface including port communications hardware for electronic and/or optical data communication with a fourth purpose-specific application for demand planning for product and quantity forecasts; and
   a fifth purpose-specific application interface including port communications hardware for electronic and/or optical data communication with a fifth purpose-specific application for work order management;

wherein said manager server hardware is adapted to first generate work orders for deployment of new document service equipment, removal of old document service equipment, and reconfiguring of existing document service equipment; and wherein said manager server hardware is adapted to next receive a first status from a first document production device of said one or more document production devices, said first status being indicative of a current level of resources available to said first document production device, and to communicate a request, to at least one of said first, second, third, fourth, and fifth purpose-specific applications over a corresponding purpose-specific application interface, for a resource to transition said first document production device from said first status to a second status that is indicative of a target level of resources for said first document production device.

2. The document service manager system of claim 1, wherein said one or more document production devices are selected from a group consisting of printers, facsimile machines, copiers, plotters, scanners and mixtures thereof.

3. The document service manager system of claim 2, wherein said manager server hardware is adapted to host a web service configured to render a remotely accessible user interface across said communications network.

4. The document service manager system of claim 3, wherein said first or second status of said one or more document production devices includes information about at least one of: usage history, cost, device type, device model, ink level, toner level, or remaining paper level.

5. The document service manager system of claim 4, wherein said manager server hardware is adapted to programmatically transition from said first status to said second status in response to fulfillment of said target level of resources.

6. The document service manager system of claim 5, wherein a local user interface is adapted to receive user approval or denial of said target level of resources from said remotely accessible user interface.

7. A method for optimizing a lifecycle of document production devices in a document service manager system having manager server hardware comprising:
a plurality of local user interfaces including port communications hardware for electronic and/or optical data communication with one or more document production devices;
a first purpose-specific application interface including port communications hardware for electronic and/or optical data communication with a first purpose-specific application for management of a sales force;
a second purpose-specific application interface including port communications hardware for electronic and/or optical data communication with a second purpose-specific application for fleet auditing support;
a third purpose-specific application interface including port communications hardware for electronic and/or optical data communication with a third purpose-specific application for enterprise resource planning;
a fourth purpose-specific application interface including port communications hardware for electronic and/or optical data communication with a fourth purpose-specific application for demand planning for product and quantity forecasts; and
a fifth purpose-specific application interface including port communications hardware for electronic and/or optical data communication with a fifth purpose-specific application for work order management, the method comprising the following steps performed by the manager server hardware:
gathering information about said one or more document production devices, said information including at least a first status of said one or more document production devices;
analyzing said information to automatically formulate at least one proposed solution to an existing inefficiency;
proposing said at least one solution to a decision maker wherein the decision maker is a system administrator other than a user receiving document services;
creating a work order automatically that is dependent on whether said decision maker chooses to execute said at least one proposed solution; and
managing completion of said work order automatically if approved by the decision maker to update said first status of said one or more document production devices to arrive at a second status.

8. The method of claim 7, wherein the step for managing completion of said work order further comprises automated interaction between said manager server hardware and a service provider to request fulfillment of at least one resource, wherein fulfillment of said at least one resource will programmatically change said first status to said second status.

9. A document service manager system comprising:
manager server hardware configured to host a document management service, said manager server hardware comprising:
a plurality of local user interfaces including port communications hardware for electronic and/or optical data communication with one or more remote user interfaces and one or more document production devices over a communications network; and
a first purpose-specific application interface including port communications hardware for electronic and/or optical data communication with a first purpose-specific application for management of a sales force;
a second purpose-specific application interface including port communications hardware for electronic and/or optical data communication with a second purpose-specific application for fleet auditing support;
a third purpose-specific application interface including port communications hardware for electronic and/or optical data communication with a third purpose-specific application for enterprise resource planning;
a fourth purpose-specific application interface including port communications hardware for electronic and/or optical data communication with a fourth purpose-specific application for demand planning for product and quantity forecasts; and
a fifth purpose-specific application interface including port communications hardware for electronic and/or optical data communication with a fifth purpose-specific application for work order management;
wherein said manager server hardware is adapted to receive a first status from a first document production device of said one or more document production devices over a first local user interface of said plurality of local user interfaces, said first status being indicative of a current level of resources available to said first document production device,
wherein said manager server hardware is adapted to communicate a first work order request said fifth purpose-specific application over said fifth purpose-specific application interface for a first work order for a resource to transition said first document production device from said first status to a second status that is indicative of a target level of resources for said first document production device, wherein said manager server hardware is adapted to receive a user request over a first local user interface for an additional document production device, wherein said manager server hardware is adapted to communicate a second work order request to said fifth purpose-specific application over said fifth purpose-specific application interface for a second work order to provide the additional document production device to a user, wherein said manager server hardware is adapted to receive a request for service from a malfunctioning one of said one or more document production devices through said first local user interface, and wherein said manager server hardware is adapted to communicate a third work order request to said fifth purpose-specific application over said fifth purpose-specific application interface for a third work order to provide maintenance service to said malfunctioning one of said one or more document production devices.

10. The document service manager system of claim 9, wherein said first purpose-specific application for management of the sales force is configured to be used to track and manage sales opportunities generated by transaction with an end customer.

11. The document service manager system of claim 9, wherein said first purpose-specific application for management of the sales force is a web-based application.

12. The document service manager system of claim 11, wherein said web-based application is salesforce.com.

13. The document service manager system of claim 9, wherein said second purpose-specific application for the fleet auditing support is configured to be used to provide usage and asset information regarding said first document production device that is described by current or target state of a customer.

14. The document service manager system of claim 9, wherein said third purpose-specific application for the enterprise resource planning is configured to be used to provide multiple purpose-specific modules that enable customer account management functions and operation.

15. The document service manager system of claim 14, wherein said purpose-specific modules are selected from modules that contain:

information about products that will be shipped to or billed to a customer;

customer contact information;

asset information about each asset installed at a customer site; and information on products that are available for sale as well as their purchase price to said customer.

16. The document service manager system of claim 15, wherein a module that contains the customer contact information is part of a database that communicates with said document service manager system.

17. The document service manager system of claim 15, wherein a module that contains the asset information is an installment application.

18. The document service manager system of claim 15, wherein a module that contains the information on products that are available for sale as well as their purchase price to said customer is a price application.

19. The document service manager system of claim 18, wherein said price application is customer-specific.

20. The document service manager system of claim 9, wherein said fifth purpose-specific application for the work order management is configured to be used to generate work orders and track progress of work orders that are used to perform actions on behalf of a customer.

* * * * *